(12) United States Patent
Kovach et al.

(10) Patent No.: US 10,492,353 B2
(45) Date of Patent: Dec. 3, 2019

(54) SYSTEM AND METHOD FOR REDUCING SOIL AND CROP RESIDUE ACCUMULATION RELATIVE TO GROUND-ENGAGING TOOLS OF A TILLAGE IMPLEMENT

(71) Applicant: CNH Industrial Canada, Ltd., Saskatchewan (CA)

(72) Inventors: Michael G. Kovach, Morton, IL (US); Martin J. Roberge, Saskatchewan (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 15 days.

(21) Appl. No.: 15/617,045

(22) Filed: Jun. 8, 2017

(65) Prior Publication Data
US 2018/0352718 A1 Dec. 13, 2018

(51) Int. Cl.
*A01B 49/02* (2006.01)
*A01B 76/00* (2006.01)
*A01B 63/111* (2006.01)

(52) U.S. Cl.
CPC ......... *A01B 49/027* (2013.01); *A01B 63/1112* (2013.01); *A01B 76/00* (2013.01)

(58) Field of Classification Search
CPC ............................. A01B 76/00; A01B 49/027
See application file for complete search history.

(56) References Cited

U.S. PATENT DOCUMENTS

| | | | | |
|---|---|---|---|---|
| 3,608,557 A * | 9/1971 | Evans | ............... | A01F 12/56 460/103 |
| 3,863,428 A * | 2/1975 | Baxter | ............... | A01D 46/085 116/70 |
| 4,143,664 A * | 3/1979 | Chorney | ............... | A01F 11/06 460/1 |
| 7,354,341 B1 * | 4/2008 | Smith | ............... | A01D 41/127 460/4 |
| 7,452,267 B2 * | 11/2008 | Bundy | ............... | A01D 41/1274 460/6 |
| 8,408,149 B2 * | 4/2013 | Rylander | ............... | A01B 63/32 111/140 |

(Continued)

*Primary Examiner* — Matthew Troutman
(74) *Attorney, Agent, or Firm* — Rebecca L. Henkel; Richard K. DeMille (57) ABSTRACT

A method for reducing material accumulation relative to ground-engaging tools of a tillage implement may include monitoring, with a computing device, an accumulation parameter as a tillage operation is being performed, wherein the accumulation parameter provides an indication of material accumulation relative to a plurality of ground-engaging tools of the tillage implement. The method may also include comparing, with the computing device, the accumulation parameter to a material accumulation threshold, wherein the material accumulation threshold is indicative of a given degree of material accumulation relative to the plurality ground-engaging tools. In addition, based on the comparison between the accumulation parameter and the material accumulation threshold, the method may include controlling, with the computing device, an operation of at least one component of the tillage implement to execute a control action for reducing an amount of the material accumulation relative to the plurality of ground-engaging tools.

19 Claims, 4 Drawing Sheets

(56) References Cited

U.S. PATENT DOCUMENTS

| | | | |
|---|---|---|---|
| 9,241,440 B2 | 1/2016 | Roberge | |
| 9,405,039 B2* | 8/2016 | Anderson | A01B 71/08 |
| 9,485,900 B2* | 11/2016 | Connell | A01B 76/00 |
| 2004/0093841 A1* | 5/2004 | Clauss | A01D 41/127 |
| | | | 56/16.4 R |
| 2006/0246966 A1* | 11/2006 | Smith | A01D 41/1276 |
| | | | 460/112 |
| 2008/0234017 A1* | 9/2008 | Bundy | A01D 41/1274 |
| | | | 460/6 |
| 2016/0088787 A1* | 3/2016 | Connell | A01B 76/00 |
| | | | 701/50 |

* cited by examiner

SYSTEM AND METHOD FOR REDUCING SOIL AND CROP RESIDUE ACCUMULATION RELATIVE TO GROUND-ENGAGING TOOLS OF A TILLAGE IMPLEMENT

FIELD OF THE INVENTION

The present subject matter relates generally to tillage implements and, more particularly, to a system and method for reducing material accumulation relative to ground-engaging tools of a tillage implement, such as accumulation of crop residue and soil/mud on discs and other ground-engaging tools during the performance of a tillage operation.

BACKGROUND OF THE INVENTION

Once a crop has been harvested, residual crop materials frequently remain on the farmland surface. Typically, this crop residue is incorporated within the soil profile of the farmland in an effort to maintain soil nutrient integrity. For example, management of corn cropped fields commonly includes the incorporation of the residual corn stalks with field soil once the corn, and occasionally a portion of the stalk, has been harvested. Whereas some growers harvest a majority of the kernel, cob, and stalk material, others harvest only the kernel and discharge a majority of the chaff or cob and stalk materials onto the farmland. Regardless of the quantity of stalk material that is harvested, the subsequent preparation of the farmland requires incorporation of the stalk or crop residue with the field soil, it is generally understood that the size of the crop residue particles as well as the surface area of the crop residue exposed to the soil affects crop residue decomposition. Specifically, reduced crop residue particle size and increased surface contact of the crop residue with adjoining soil improves crop residue decomposition.

As crop is being harvested, the combine spreader typically distributes crop residue onto the field, if necessary or desired, a crop residue conditioner, such as a stalk chopper, may also be pulled across the harvested field during autumn. The stalk chopper cuts the remaining stalks into smaller, more easily workable and degradable sized pieces. Thereafter, a disc harrow is used to smooth and level the farmland or seedbed and till a portion of the crop residue with the soil. The disc harrow not only mixes the crop residue with the underlying soil to return nutrients to the soil, but also can be used to establish a residue layer over the farmland to protect against erosion and provide moisture control during the winter months before replanting in the spring.

Disc harrows typically include one or more disc gangs, each including a series of steel discs or disc blades with tapered or beveled peripheral edges. The discs, although tending to roll or rotate as they are pulled forward, penetrate into and break up the soil and stalks and other crop residue. Ideally, the discs engage the ground such that the soil and crop residue ride along and across the concave surfaces of the discs so as to be turned or inverted. However, in many instances, crop residue, soil/mud, and/or other materials tend to accumulate or build-up along the sides or surfaces of the discs. Such material accumulation can significantly reduce the effectiveness of the discs during the performance of a tillage operation.

Accordingly, a system and method for reducing material accumulation relative to ground-engaging tools of a tillage implement, such as discs and other rotary tools, would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for reducing material accumulation relative to ground-engaging tools of a tillage implement. The method may include monitoring, with a computing device, an accumulation parameter as a tillage operation is being performed, wherein the accumulation parameter provides an indication of material accumulation relative to a plurality of ground-engaging tools of the tillage implement. The method may also include comparing, with the computing device, the accumulation parameter to a material accumulation threshold, wherein the material accumulation threshold is indicative of a given degree of material accumulation relative to the plurality ground-engaging tools. In addition, based on the comparison between the accumulation parameter and the material accumulation threshold, the method may include controlling, with the computing device, an operation of at least one component of the tillage implement to execute a control action for reducing an amount of the material accumulation relative to the plurality of ground-engaging tools.

In another aspect, the present subject matter is directed to a system for reducing material accumulation relative to ground-engaging tools when performing a tillage operation. The system may include an implement having a frame and a plurality of ground-engaging tools supported on the frame. The system may also include a controller having a processor and associated memory. The memory may include instructions that, when implemented by the processor, configure the controller to monitor an accumulation parameter as the tillage operation is being performed, wherein the accumulation parameter provides an indication of material accumulation relative to the plurality of ground-engaging tools. The controller may also be configured to compare the accumulation parameter to a material accumulation threshold, wherein the material accumulation threshold is indicative of a given degree of material accumulation relative to the plurality ground-engaging tools. In addition, based on the comparison between the accumulation parameter and the material accumulation threshold, the controller may be configured to control an operation of at least one component of the tillage implement to execute a control action for reducing an amount of the material accumulation relative to the plurality of ground-engaging tools.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for reducing material accumulation relative to one or more ground-engaging tools of a tillage implement as a tillage operation is being performed within a field. Specifically, in several embodiments, a controller of the disclosed system may be communicatively coupled to one or more accumulation sensor(s) in order to monitor the accumulation of crop residue, soil/mud, and/or other materials relative to the ground-engaging tools of the tillage implement, such as a plurality of discs or disc blades of the tillage implement. When the monitored material accumulation exceeds a given threshold(s), the controller may be configured to execute a corrective or control action designed to reduce the amount of material accumulation relative to the ground-engaging tools. For instance, in one embodiment, the controller may be configured to temporarily raise the ground-engaging tools relative to the ground to reduce their penetration depth and allow the material accumulated relative to the tools to break-up or otherwise be diminished. After a pre-set time period, the ground-engaging tools may then be lowered relative to the ground and returned to their original penetration depth. In another embodiment, the controller may be configured to raise the ground-engaging tools out of the ground and subsequently actuate the tools, such as by rotating the tools in reverse or by vibrating the tools as they are located above the ground. After actuating the tools for a given time period, the ground-engaging tools may then be lowered back into the ground and returned their original penetration depth.

As will be described below, in several embodiments, the controller may be configured to compare the monitored material accumulation to two or more accumulation thresholds, with each threshold indicating a differing degree or severity of material accumulation. For instance, in one embodiment, the controller may be configured to compare the monitored material accumulation to first and second predetermined accumulation thresholds, with the first threshold being associated with an intermediate level of material accumulation and the second threshold being associated with a greater degree of material accumulation. In such an embodiment, the aggressiveness of the control action executed by the controller may vary depending on which threshold has been reached and/or passed. For example, if the monitored material accumulation has only reached or passed the first predetermined accumulation threshold, the controller may be configured to execute a less aggressive control action, such as by temporarily raising the ground-engaging tools relative to the ground to reduce their penetration depth. However, if the monitored material accumulation has reached or passed the second predetermined accumulation threshold, the controller may be configured to execute a more aggressive control action, such as by stopping the tillage operation and raising the ground-engaging tools out of the ground to allow them to be actuated (e.g., by rotating the tools in reverse or by vibrating the tools).

It should be appreciated that, in one embodiment, the disclosed system and method may be executed within a "preventative material accumulation" mode that can be linked or otherwise used in connection with a precision farming map (e.g., a GPS based map). In such an embodiment, the controller may be configured to automatically perform one of the control actions to reduce the amount of material accumulation relative to the ground-engaging tools as soon as the implement is raised when turning at the headlands.

It should also be appreciated that, in general, the control actions disclosed herein will generally be described with reference to being automatically executed by the system controller in response to determining that the monitored material accumulation exceeds a given threshold. However, in other embodiments, the control actions may be executed in response to inputs received from the operator. For instance, in one embodiment, the controller may be configured to provide a notification to the operator when the monitored material accumulation exceeds one of the accumulation thresholds, such as by displaying a notification on a display device located within the cab or by generating an audible notification. Thereafter, if desired, the operator may provide suitable inputs for executing one or more control actions designed to reduce the amount of material accumulation relative to the ground-engaging tools.

Figure 1:
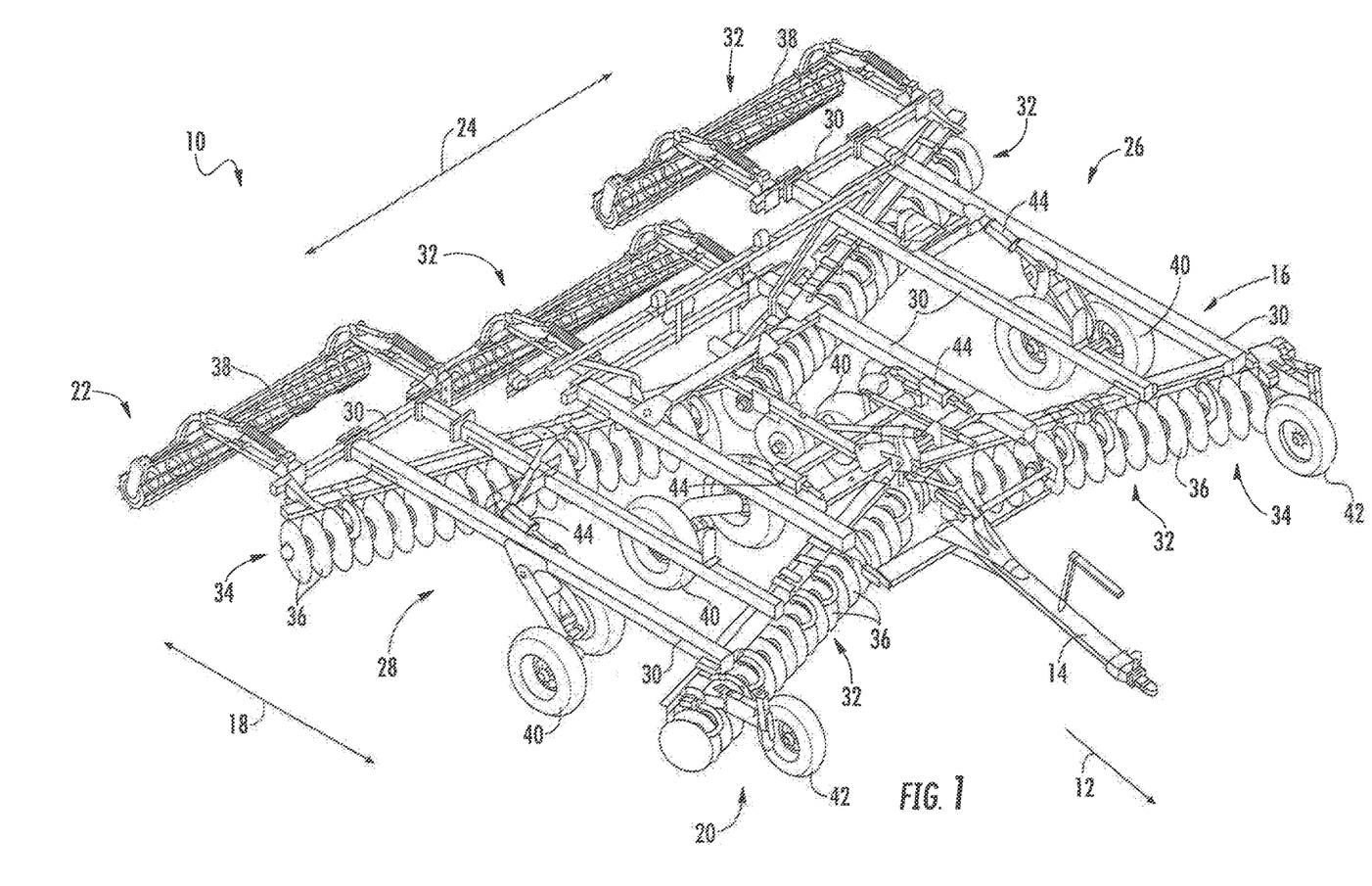
FIG. 1 illustrates a perspective view of one embodiment of a tillage implement in accordance with aspects of the present subject matter.

Referring now to FIG. 1, a perspective view of one embodiment of a tillage implement 10 is illustrated in accordance with aspects of the present subject matter. In general, the implement 10 may be configured to be towed along a direction of travel 12 by a work vehicle (not shown), such as a tractor or other agricultural work vehicle. For example, the work vehicle may be coupled to the implement 10 via a hitch assembly 14 or using any other suitable attachments means. As shown, the hitch assembly 14 may be coupled to a frame 16 of the implement 10 to facilitate towing the implement 10 in the direction of travel 12.

As shown, the frame 16 may extend in a longitudinal direction (e.g., as indicated by arrow 18 in FIG. 1) between a forward end 20 and an aft end 22. The frame 16 may also extend in a lateral direction (e.g., as indicated by arrow 24 in FIG. 1) between a first side 26 and a second side 28. In addition, the frame 16 may generally include a plurality of structural frame members 30, such as beams, bars, and/or the like, configured to support or a plurality of implement components, such as various ground-engaging tools 32.

For example, in one embodiment, the frame 16 may be configured to support one or more gangs or sets 34 of disc blades 36. In such an embodiment, each disc blade 36 may, for example, include both a concave side (not shown) and a convex side (not shown). In addition, the gangs 34 of disc blades 36 may be oriented at an angle relative to the travel direction 12 to promote more effective tilling of the soil. Moreover, in one embodiment, the implement 10 may optionally include additional ground-engaging tools 32, such as one or more baskets or rotary firming wheels 38. As is generally understood, the baskets 38 may be configured to reduce the number of clods in the soil and/or firm the soil over which the implement 10 travels. It should be appreciated that, in other embodiments, the frame 16 may support any other suitable ground-engaging tools 32 and/or any suitable combination of various types of ground-engaging tools 32. For example, in one embodiment, the frame 16 may support any combination of shanks, leveling blades, tines, disc blades, basket assemblies, and/or the like.

As shown in FIG. 1, the implement 10 may also include various wheel assemblies coupled to the frame 16 to support the frame 16 relative to the ground and to facilitate towing the implement 10 in the direction of travel 12. Specifically, in several embodiments, the implement 10 may include a plurality of center support wheel assemblies 40 located centrally on the implement's frame 16 between its forward and aft ends 20, 22, with the center support wheel assemblies 40 being spaced apart from one another in the lateral direction 24 of the implement 10 between its first and second sides 26, 28. In addition, the implement 10 may also include a plurality of forward support wheel assemblies 42 coupled to the frame 16 proximate to the forward end 20 of the frame 16, with the forward support wheel assemblies 42 being spaced apart from one another in the lateral direction 24 of the implement 10 between its first and second sides 26, 28. As shown in FIG. 1, the forward support wheel assemblies 42 may be spaced apart from the center support wheel assemblies 40 in the longitudinal direction 18 of the implement 10.

Additionally, the implement 10 may also include any suitable number of actuators for adjusting the relative positioning between various components of the implement 10. For instance, as shown, the implement 10 may include a plurality of linear actuators 44 (e.g., hydraulic or pneumatic cylinders) coupled between the center support wheel assemblies 40 and the frame 16 for raising and lowering the frame 16 relative to the ground, thereby allowing the penetration depth and/or the down pressure of the disc blades 36 to be adjusted. In alternate embodiments, the actuators 44 may be configured to adjust the relative positioning between any other components of the implement 10, such as the relative positioning between the front support wheel assemblies 42 and the frame 16 or between one or more of the gangs 34 of disc blades 36 and the frame 16.

It should be appreciated that the configuration of the implement 10 described above and shown in FIG. 1 is provided only to place the present subject matter in an exemplary field of use. Thus, it should be appreciated that the present subject matter may be readily adaptable to any manner of implement configuration.

Figure 2:
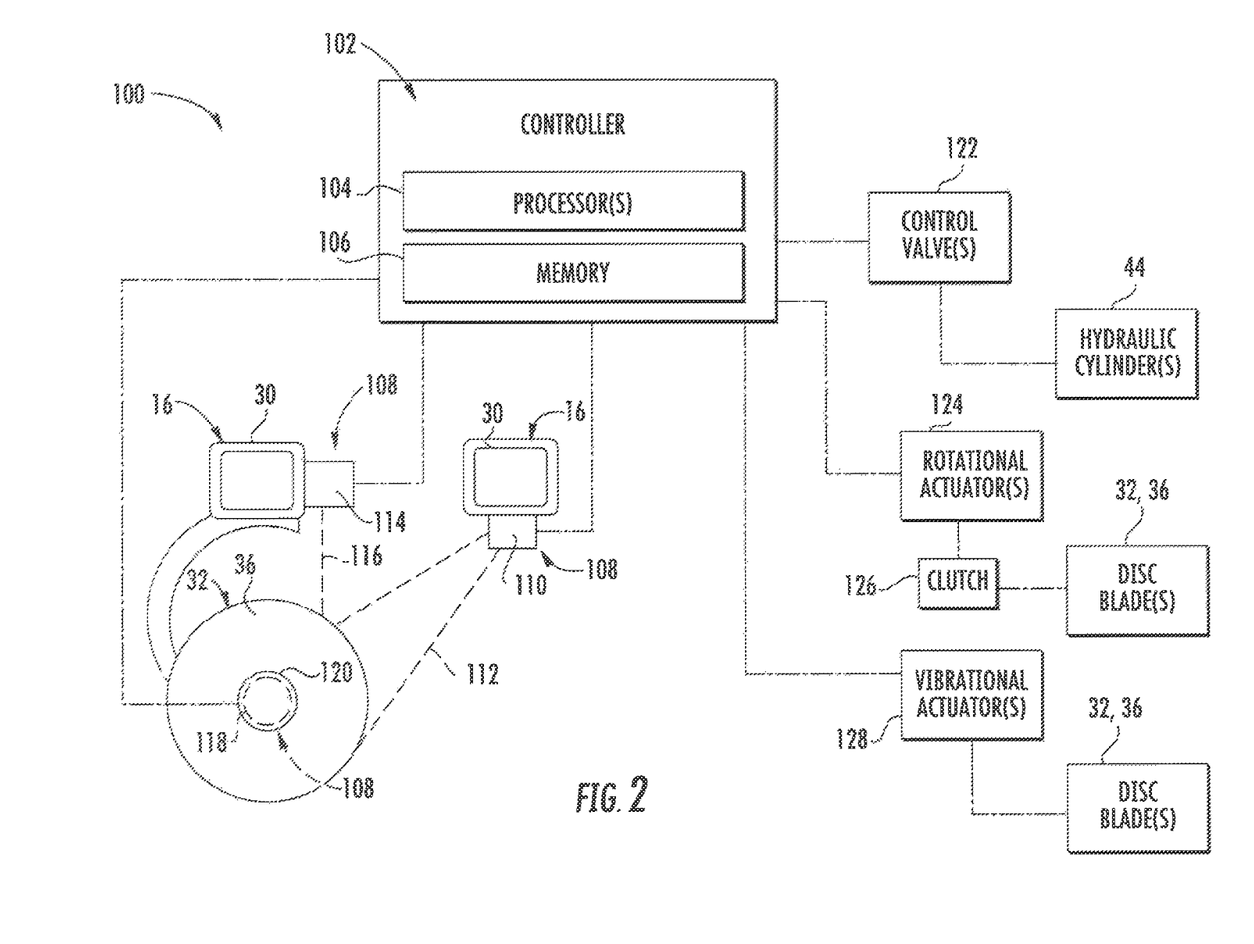
FIG. 2 illustrates a schematic view of one embodiment of a system for reducing material accumulation relative to one or more ground-engaging tools of a tillage implement in accordance with aspects of the present subject matter.

Referring now to FIG. 2, a schematic view of one embodiment of a system 100 for reducing the amount of material accumulation relative to one or more ground-engaging tools of a tillage implement is illustrated in accordance with aspects of the present subject matter. In general, the system 100 will be described herein with reference to the tillage implement 10 shown in FIG. 1. However, in other embodiments, the disclosed system 100 may be used to reduce the amount of material accumulation occurring relative to the ground-engaging tools of any other suitable implement having any other suitable implement configuration. In addition, for purposes of description, aspects of the disclosed system 100 will be described herein as being used to reduce the amount of material accumulation occurring relative to one or more rotary tools of a tillage implement (e.g., the disc blades 36 shown in FIG. 1) during the performance of a tillage operation. However, in other embodiments, the system 100 may be used to reduce the amount of material accumulation occurring relative to any other suitable ground-engaging tools.

As shown in FIG. 2, the system 100 may include a controller 102 configured to automatically execute one or more aspects of the algorithms and/or methods described herein, including controlling the operation of one or more components of the implement 10 and/or one or more other system components so as to allow one or more control actions to be performed for reducing the amount of material accumulation occurring relative to the ground-engaging tools 32 of the implement 10. In general, controller 102 may correspond to any suitable processor-based device known in the art, such as one or more computing devices. Thus, in several embodiments, the controller 102 may include one or more processor(s) 104 and associated memory 106 device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 106 of the controller 102 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 106 may generally be configured to store suitable computer-readable instructions that, when implemented by the processor(s) 104, configure the controller 102 to perform various computer-implemented functions, such as one or more aspects of the control algorithm 200 described below with reference to FIG. 3 and/or one or more aspects of the method 300 described below with reference to FIG. 4. In addition, the controller 102 may also include various other suitable components, such as a communications circuit or module, one or more input/output channels, a data/control bus and/or the like.

It should be appreciated that the controller 102 may correspond to an existing controller associated with the implement 10 (or the work vehicle towing the implement 10) or the controller 102 may correspond to a separate controller. For instance, in one embodiment, the controller 102 may form all or part of a separate plug-in module that may be installed to allow for the disclosed system and method to be implemented without requiring additional software to be uploaded onto existing control devices of the implement 10 or associated work vehicle.

Additionally, in several embodiments, the system 100 may also include one or more accumulation sensors 108 communicatively coupled to the controller 102 for detecting an accumulation parameter associated with the current amount of material accumulation occurring relative to the ground-engaging tools 32. For example, as schematically shown in FIG. 2, one or more accumulation sensor(s) 108 may be mounted to a portion of the implement 10 (e.g., one of the frame members 30 of the frame 16) at any suitable location relative to the ground-engaging tools 32 that allows the accumulation sensor(s) 108 to detect the amount of material accumulation occurring at or adjacent to such tools 32. Specifically, to detect the amount of material accumulation occurring along the various gangs 34 of disc blades 36 of the tillage implement 10 shown in FIG. 1, a plurality of accumulation sensors 108 may be coupled to the flame 16 at locations spaced apart laterally between the opposed sides 26, 28 of the frame 16 and/or lengthwise between the opposed ends 22, 24 of the frame 16 to allow each accumulation sensor 108 to detect the amount of material accumulation occurring relative to a single disc blade 36 or a group of two or more disc blades 36 of the plurality of disc blades 36 supported on the implement 10.

In one embodiment, the accumulation parameter detected by the accumulation sensor(s) 108 may correspond to the speed of the crop residue and/or other materials relative to the ground-engaging tools 32 (also referred to hereinafter simply as "residue speed") as the tillage implement 10 is being towed across a field during the performance of a tillage operation. Specifically, as residue and/or other materials begin to build-up or otherwise accumulate relative to a ground-engaging tool(s) 32, the speed of such residue/materials at or adjacent to the ground-engaging tool(s) 32 will begin to decrease as compared to the current ground speed of the tillage implement 10. As such, by detecting reductions in the relative residue speed during the performance of a tillage operation, the occurrence of material accumulation at or adjacent the ground-engaging tools 32 may be detected.

For instance, when there is no material accumulation or build-up relative to a ground-engaging tool(s) 32, the residue speed detected by the accumulation sensor(s) 108 may be equal or substantially equal to the ground speed of the tillage implement 10. However, as material accumulation occurs, a reduction in the relative residue speed will generally occur that is indicative of the amount of material accumulation. Thus, by correlating the relative residue speed to material accumulation, the controller 102 may be configured to determine the current amount of material accumulation occurring relative to a ground-engaging tool(s) 32 based on the sensor measurements provided by the accumulation sensor(s) 108.

It should be appreciated that, in embodiments in which the accumulation parameter corresponds to the relative residue speed, the accumulation sensor(s) 108 may generally correspond to any suitable sensor(s) and/or sensing device(s) that is configured to detect the difference between the speed of the crop residue and/or other materials and the actual ground speed. For instance, in one embodiment, each accumulation sensor 108 may correspond to an optical sensor 110, such as a radar sensor, a laser beam (e.g., a stationary or scanning laser), and/or any other suitable sensing device. For example, as shown schematically in FIG. 2, one or more optical sensors 110 may be coupled to a portion of the frame 16 such that the optical sensor(s) has a field of view 112 that encompasses a portion of the ground immediately in front of one or more ground-engaging tools 32 as well as a portion of the above-ground area surrounding such tools(s) 32. In such an embodiment, the optical sensor(s) 110 may, for example, be configured to detect the relative residue speed by transmitting radio waves (e.g., for a radar sensor) or light (e.g., for a laser sensor) in the direction of the residue and/or other material positioned at or adjacent to the ground-engaging tool(s) 32 and detecting the reflection of such waves/light off of such residue/material.

Additionally, in one embodiment, the accumulation parameter detected by the accumulation sensor(s) 108 may correspond to the height or position of any residue or other materials relative to a fixed reference point on the tillage implement 10 as the implement 10 is being towed across a field during the performance of a tillage operation. Specifically, as residue and/or other materials begin to accumulate relative to a ground-engaging tool(s) 32, the residue/materials may build-up or stack vertically at or adjacent to the ground-engaging tool(s) 32, thereby increasing the height of residue/materials relative to the remainder of the ground. In such instance, by mounting the accumulation sensor(s) 108 at a given location on the tillage implement 10 (e.g., at a given location on the frame 30), the height or position of the residue/materials may be detected relative to such location to allow the amount of material accumulation to be monitored.

It should be appreciated that, in embodiments in which the accumulation parameter corresponds to the height or position of the residue/materials relative to a fixed reference point on the tillage implement 10, the accumulation sensor(s) 108 may generally correspond to any suitable sensor(s) and/or sensing device(s) that is configured to detect changes in such height/position of the residue/materials. For instance, as schematically shown in FIG. 2, each accumulation sensor 108 may, in one embodiment, correspond to one or more proximity sensors 114 mounted to a frame member 30 of the implement frame 16 at or adjacent to the location of one or more ground-engaging tools 32 such that the sensor(s) 114 has a field of view 116 directed towards the location at which material will typically build-lap or accumulate relative to the tool(s) 32. In such an embodiment, the proximity sensor(s) 114 may be configured to detect the proximity of the residue/materials relative to its mounted location on the frame 16, thereby allowing the sensor(s) 114 to detect the amount of material accumulation relative to the ground-engaging tool(s) 32.

Moreover, in embodiments in which the ground-engaging tools 32 correspond to rotary tools (e.g., disc blades 36), the accumulation parameter detected by the accumulation sensor(s) 108 may correspond to the rotational speed of the rotary tool(s) as the implement 10 is being towed across a field during the performance of a tillage operation. Specifically, as residue and/or other materials begin to accumulate relative to one or more of the rotary tool(s), the accumulated material may, in certain instances, result in a reduction of the rotational speed of the rotary tool(s). In such instances, by correlating the rotational speed of the rotary tool(s) to material accumulation, the controller 102 may be configured to determine the current amount of material accumulation occurring relative to the rotary tool(s) based on the sensor measurements provided by the accumulation sensor(s) 108.

It should be appreciated that, in embodiments in which the accumulation parameter corresponds to the rotational speed of the rotary tool(s), the accumulation sensor(s) 108 may generally correspond to any suitable sensor(s) and/or sensing device(s) that is configured to detect such rotational speed. For instance, as schematically shown in FIG. 2, each accumulation sensor 108 may correspond to one or more rotational speed sensors 118 (e.g., a shaft encoder or other suitable speed sensing device) provided in operative association with a shaft 120 of the rotary tool(s) for detecting the rotational speed of such tool(s).

Referring still to FIG. 2, in several embodiments, the controller 102 may be configured to monitor the accumulation parameter based on the sensor measurements provided by the accumulation sensor(s) 108 and compare such monitored parameter to one or more material accumulation thresholds set for the ground-engaging tools 32. In such embodiments, the threshold(s) may be associated with a given degree or magnitude of material accumulation relative to the ground-engaging tools 32. Thus, when the monitored accumulation parameter reaches or passes the specific parameter value(s) associated with the accumulation threshold(s) (e.g., by falling below or exceeding the threshold value, as the case may be), the controller 102 may determine that the actual amount of material accumulation has reaches or exceeded the accumulation amount associated with the accumulation threshold(s), in such instance, the controller 102 may be configured to execute a control or corrective action(s) designed to reduce the current amount of material accumulation relative to the ground-engaging tools 32.

For example, in one embodiment, the controller 102 may be configured to temporarily raise the ground-engaging tools 32 relative to the ground to reduce the amount of material accumulation. Specifically, as shown in FIG. 2, the controller 102 may be communicatively coupled to one or more control valves 122 configured to regulate the supply of fluid (e.g., hydraulic fluid or air) to one or more corresponding actuators 44 of the implement 10. In such an embodiment, by regulating the supply of fluid to the actuator(s) 44, the controller 102 may automatically adjust the position of the ground-engaging tools 32 relative the ground. For instance, when the accumulation parameter reaches or passes the accumulation threshold(s) (thereby indicating that an undesirable amount of the material accumulation currently exists), the controller 102 may be configured to control the operation of the actuator(s) 44 to raise the ground-engaging tools 32 relative to the ground such that the penetration depth of the tools 32 is reduced by a predetermined amount. Thereafter, following a pre-set time period, the controller 102 may then lower the ground-engaging tools 32 relative to the ground to return the tools 32 hack to their original or target penetration depth.

In another embodiment, the controller 102 may be configured to execute a control action in which the ground-engaging tools 32 are raised completely out of the ground and then subsequently actuated to reduce the amount of material accumulation relative thereto. For example, in embodiments in which the ground-engaging tools 32 correspond to rotary tools (e.g., disc blades 36), the controller 102 may be configured to raise the ground-engaging tools 32 out of the ground (e.g., by controlling the operation of the actuator 44) and subsequently rotate the tools 32 in reverse (i.e., in a direction opposite the rotational direction of such tools 32 when engaging the ground during the performance of a tillage operation). Such reverse rotation of the ground-engaging tools 32 may be used to scrape or fling off the accumulated material. For instance, one or more fixed scrapers (not shown) may be provided adjacent to each ground-engaging tool 32, such as by positioning a double-edged, fixed scraper adjacent to each disc blade 36 (e.g., a first scraper edge positioned for scraping material from the tool during normal operation and a second scraper edge positioned for scraping material from the tool during reverse rotation). In such an embodiment, by raising the tools 32 out of the ground and reversing their rotation, the tools 32 may be rotated relative to the associated scraper(s) in a manner that scrapes or knocks-off the accumulated material.

To allow for such reverse rotation of the ground-engaging tools 32, it should be appreciated that the system 100 may include one or more rotational actuators 124 (e.g., one or more hydraulic or electric motors) coupled to the tools 32. In such an embodiment, each rotational actuator 124 may be coupled to one or more of the tools 32 via a clutch 126 to allow the actuator 124 to be decoupled from the tool(s) 32 when the implement 10 is being used to perform a tillage operation. Additionally, the system controller 102 may be communicatively coupled to the rotational actuator(s) 124 to allow the controller 102 to electronically control the operation of each actuator 124. Thus, when the accumulation parameter reaches or passes the accumulation threshold(s) (thereby indicating that an undesirable amount of the material accumulation currently exists), the controller 102 may be configured to initially control the operation of the actuator(s) 44 to raise the tools 32 out of the ground and the subsequently control the operation of each rotational actuator 124 (and associated clutch 126) to allow the tools 32 to be rotated in the reverse direction. After rotating the tools 32 for a given time period, the tools 32 may then be lowered relative to the ground and returned hack to their original or target penetration depth. Given that the tools 32 are raised out of the ground to reverse their rotation, it may be desirable to perform such operation at the headlands. Alternatively, the forward travel of the implement 10 may be stopped to allow the operation to be performed within the field.

In another embodiment, upon raising the ground-engaging tools 32 out of the ground, the controller 102 may be configured to vibrate the tools 32 to reduce the amount of material accumulation thereon. For example, as shown in FIG. 2, the controller 102 may be communicatively coupled to one or more vibrational actuators 128 configured to oscillate or vibrate the tools 32. In such an embodiment, when the accumulation parameter exceeds or falls below the accumulation threshold(s) (thereby indicating that an undesirable amount of the material accumulation currently exists), the controller 102 may be configured to initially control the operation of the actuator(s) 44 to raise the ground-engaging tools 32 out of the ground and the subsequently control the operation of the vibrational actuator(s) 128 in order to vibrate the tools 32. After vibrating the ground-engaging tools 32 for a given time period, the tools 32 may then be lowered relative to the ground and returned back to their original or target penetration depth.

Figure 3:
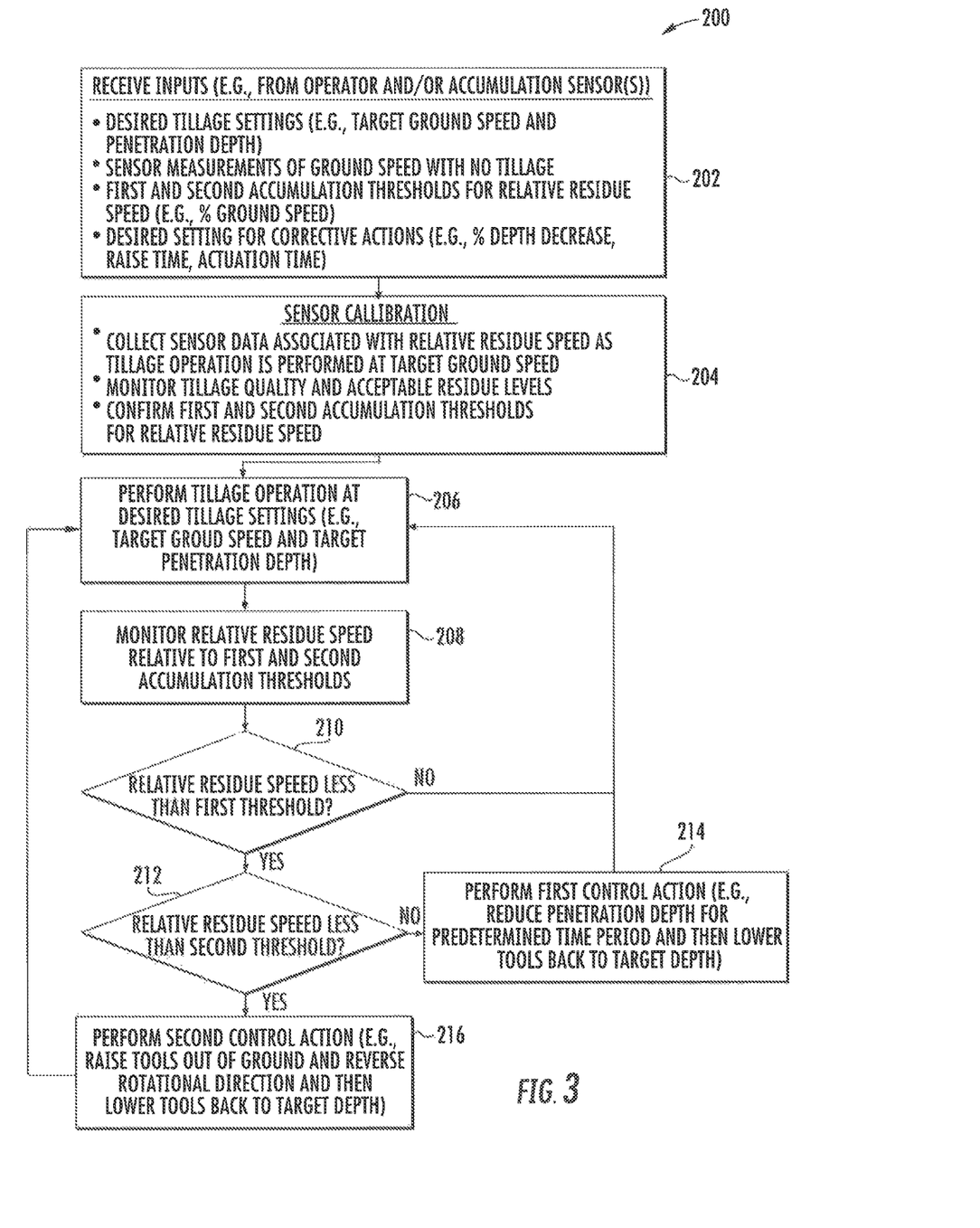
FIG. 3 illustrates a flow diagram of one embodiment of a control algorithm that can be implemented for reducing material accumulation relative to one or more ground-engaging tools of a tillage implement in accordance with aspects of the present subject matter.

Referring now to FIG. 3, a flow diagram of a specific embodiment of a control algorithm 200 that may be executed for reducing the material accumulation relative to ground-engaging tools of a tillage implement is illustrated in accordance with aspects of the present subject matter. In general, the control algorithm 200 will be described herein with reference to the tillage implement 10 shown in FIG. 1 as well as the system 100 shown in FIG. 2. However, in other embodiments, the algorithm 200 may be used in connection with any other suitable implement having any other suitable implement configuration and/or with any other suitable system having any other suitable system configuration. In addition, for purposes of description, the algorithm 200 will be described herein with the relative residue speed being used by the controller 102 as the accumulation parameter for monitoring the material accumulation relative to the ground-engaging tools 32. However, in other embodiments, one or more aspects of the algorithm 200 may be executed when any other suitable accumulation parameter is being used by the controller 102 to monitor material accumulation (e.g., the relative position and/or height of the accumulated material and/or the rotational speed of the tools 32).

It should be appreciated that, although FIG. 3 depicts control steps or functions performed in a particular order for purposes of illustration and discussion, the control algorithms discussed herein are not limited to any particular order or arrangement. One skilled in the art, using the disclosures provided herein, will appreciate that various steps or functions of the algorithms disclosed herein can be omitted, rearranged, combined, and/or adapted in various ways without deviating from the scope of the present disclosure.

As shown in FIG. 3, at (202), one or more inputs may be initially received by the system controller 102 from the operator and/or the accumulation sensor(s) 108. For example, in one embodiment, the controller 102 may be configured to receive operator inputs associated with one or more desired tillage settings, such as a target ground speed for the implement 10 and a target penetration depth for the ground-engaging tools 32. Additionally, the controller 102 may also be configured to receive initial non-tillage data from the accumulation sensor(s) 108. For instance, in one embodiment, the accumulation sensor(s) 108 (e.g., an optical sensor(s) 110) may be used to capture ground speed measurements when the ground-engaging tools 32 are raised out of the ground and the implement 10 is being towed across the field at its target ground speed. Such non-tillage sensor data may be used, for example, to calibrate subsequent sensor data collected during the performance of a tillage operation as material begins to accumulate relative to the ground-engaging tools 32.

Moreover, the controller 102 may also be configured to receive input data associated with one or more material accumulation thresholds to be applied during the tillage operation when monitoring the associated accumulation parameter. In several embodiments, the operator may be allowed to input two separate accumulation thresholds, namely a first accumulation threshold associated with an intermediate degree of material accumulation and a second accumulation threshold associated with a greater degree of material accumulation. For instance, in one embodiment, each accumulation threshold may correspond to a percentage of the target ground speed for the implement 10, such as by setting the first accumulation threshold at 50% of the target ground speed and by setting the second accumulation threshold at 10% of the target ground speed, in such an embodiment, as the residue speed decreases with accumulation of material relative to the ground-engaging tools 32, the residue speed may initially reach and fail below the first accumulation threshold, thereby indicating that an intermediate level of material has accumulated relative to the ground-engaging tools 32. Similarly, as the relative residue speed continues to decrease with further material accumulation, the residue speed may then reach and fall below the second accumulation threshold, thereby indicating that a greater degree of material accumulation is present (e.g., an accumulation level at or near plugging).

In addition, the controller 102 may be configured to receive any other suitable inputs. For example, in one embodiment, the controller 102 may receive one or more operator inputs associated with the desired settings for the control or corrective actions to be executed in response to the determination of excessive material accumulation relative to the ground-engaging tools 32. Such desired control settings may include, but are not limited to, a desired percent reduction in penetration depth when raising the tools 32, a desired time period for reducing the penetration depth, a desired time for rotating or vibrating the ground-engaging tools 32 when raised out of the ground, and/or the like.

Moreover, as shown in FIG. 3, at (204), the controller 102 may also be configured to calibrate the sensor data provided by the accumulation sensor(s) 108. For example, in one embodiment, the controller 102 may be configured to collect sensor data from the accumulation sensor(s) 108 that is associated with the relative residue speed as a tillage operation is being performed at the target ground speed. Such tillage sensor data may then be analyzed in combination with the non-tillage sensor data collected by the accumulation sensor(s) 108 to calibrate the sensors 108 and the associated data. In doing so, the accumulation thresholds selected for the system 100 may also be confirmed. For instance, when the sensor data indicates that the monitored accumulation parameter has reached or passed one of the thresholds, the actual material accumulation existing relative to the ground-engaging tools 32 may be documented and input into the controller to allow adjustments to be made, if necessary or desired, to the sensor calibration.

Referring still to FIG. 3, following the initial control steps of receiving the input data and calibrating the accumulation sensors 108, the remainder of the algorithm 200 may then be performed during normal operation of the tillage implement 10. For example, at (206), a tillage operation may be performed using the desired tillage settings input by the operator (e.g., the target ground speed and the target penetration depth). Additionally, as the tillage operation is being performed, the controller may, at (208), monitor the speed of the crop residue and/or other material relative to the ground-engaging tools 32 via the sensor measurements provided by the accumulation sensors) 108. As the relative residue speed is being monitored, the controller 102 may be configured to continually compare the residue speed to the associated accumulation thresholds. For example, as shown in FIG. 3, at (210), the controller 102 may determine whether the monitored residue speed is less than the first accumulation threshold set for the algorithm 200. If the current residue speed is not less than the first accumulation threshold (thereby indicating that the current material accumulation level is acceptable), the algorithm 200 may loop back to box 206. However, if the current residue speed is less than the first accumulation threshold, the controller 102 may, at (212), determine whether the monitored residue speed is less than the second accumulation threshold set for the algorithm 200.

As shown in FIG. 3, if the current residue speed is not less than the second accumulation threshold (thereby indicating that the current material accumulation level is greater than the accumulation level associated with the first threshold, but less than the accumulation level associated with the second threshold), the controller 102 may, at (214) be configured to perform a first control action designed to reduce the amount of material accumulation. However, if the current residue speed is less than the second accumulation threshold (thereby indicating that the current material accumulation level is greater than the accumulation level associated with the second threshold), the controller 102 may be configured to perform a second control action designed to reduce the amount of material accumulation. As indicated above, in several embodiments, the first and second control actions may correspond to differing control or corrective actions. Specifically, the second control action may correspond to a more aggressive control action that the first control action given the greater degree of material accumulation relative to the ground-engaging tools 32.

For example, in one embodiment, when executing the first control action, the controller 102 may simply be configured to temporarily raise the ground-engaging tools 32 relative to the ground, such as by reducing the penetration depth of the ground-engaging tools 32 by a given percentage for a pre-set time period (e.g., based on the desired control action settings received from the operator at 202). In such an embodiment, upon expiration of the associated time period, the ground-engaging tools 32 may be lowered back down to the target penetration depth. Additionally, when executing the second control action, the controller 102 may, in one embodiment, be configured to raise the ground-engaging tools 32 completely out of the ground and subsequently actuate the tools 32 via one or more of the associated system actuators 124, 128. For example, as described above, the controller 102 may be configured to rotate the tools 32 in reverse for a pre-set time period prior to lowering the tools hack down into the ground. Alternatively, the controller 102 may be configured to vibrate the tools 32 for a pre-set time period prior to lowering the tools 32 back down into the ground. As indicated above, when performing such a control action in the field, the implement 10 may be stopped as the tools 32 are raised out of the ground and rotated/vibrated.

Figure 4:
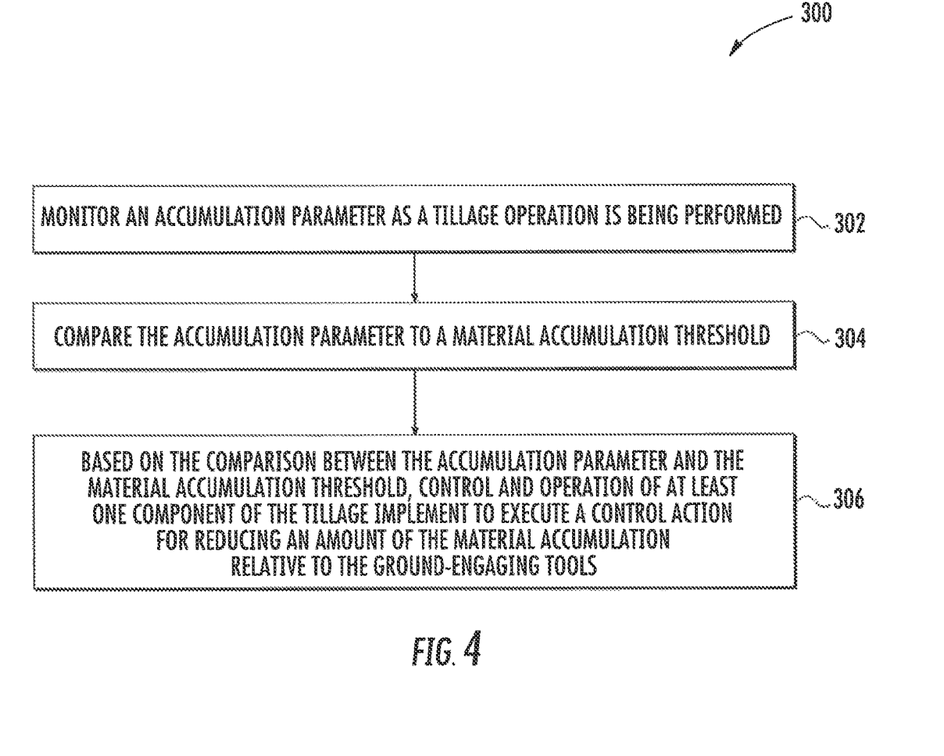
FIG. 4 illustrates a flow diagram of one embodiment of a method for reducing material accumulation relative to one or more ground-engaging tools of a tillage implement in accordance with aspects of the present subject matter.

Referring now to FIG. 4, a flow diagram of one embodiment of a method 300 for reducing material accumulation relative to ground-engaging tools of a tillage implement is illustrated in accordance with aspects of the present subject matter. In general, the method 300 will be described herein with reference to the tillage implement 10 shown in FIG. 1 as well as the system 100 shown in FIG. 2. However, in other embodiments, the method 300 may be used in connection with any other suitable implement having any other suitable implement configuration and/or with any other suitable system having any other suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (302), the method 300 may include monitoring an accumulation parameter as a tillage operation is being performed. For example, as indicated above, the controller 102 may be communicatively coupled to one or more accumulation sensors 108 to allow the controller 102 to monitor an accumulation parameter that provides an indication of the material accumulation relative to the ground-engaging tools 32 of the tillage implement 10.

Additionally, at (304), the method 300 may include comparing the accumulation parameter to a material accumulation threshold. For instance, as described above, one or more material accumulation thresholds may be applied by the controller 102 for assessing the monitored accumulation parameter, with each threshold being indicative of a given degree of material accumulation relative to the ground-engaging tools 32. Specifically, in one embodiment, the controller 102 may be configured to compare the monitored accumulation parameter to both a first accumulation threshold and a second accumulation threshold, with the separate thresholds being associated with differing levels or degrees of material accumulation. For example, the first accumulation threshold may be associated with an intermediate degree of material accumulation and the second accumulation threshold may be associated with a greater degree of material accumulation (e.g., a level at or near plugging).

Moreover, at (306), based on the comparison between the accumulation parameter and the material accumulation threshold, the method 300 may include controlling an operation of at least one component of the tillage implement to execute a control action for reducing an amount of the material accumulation relative to the ground-engaging tools. For instance, as indicated above, the controller may be configured to control the operation of various components to execute one or more of the control actions described herein. Specifically, the controller 102 may be configured to control the operation of one more linear actuators 44 of the implement 10 for reducing the penetration depth of the ground-engaging tools 32 and/or for raising the tools 32 out of the ground. In addition, the controller 102 may be configured to control the operation of one or more actuators provided in operative association with the ground-engaging tools 32, such as one or more rotational actuators 124 for rotating the tools 32 in reverse and/or one or more vibrational actuators 128 for vibrating tools 32.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for reducing material accumulation relative to ground-engaging tools of a tillage implement, the method comprising:

monitoring, with a computing device, an accumulation parameter as a tillage operation is being performed, the accumulation parameter providing an indication of material accumulation relative to a plurality ground-engaging tools of the tillage implement;

comparing, with the computing device, the accumulation parameter to a material accumulation threshold, the material accumulation threshold being indicative of a given degree of material accumulation relative to the plurality of ground-engaging tools; and based on the comparison between the accumulation parameter and the material accumulation threshold, controlling, with the computing device, an operation of at least one component of the tillage implement to execute a control action for reducing an amount of the material accumulation relative to the plurality of ground-engaging tools, wherein the control action comprises:

raising the plurality of ground-engaging tools out of the ground; and subsequently actuating the plurality of ground-engaging tools, wherein actuating the plurality of ground-engaging tools comprises at least one of rotating the plurality of ground-engaging tools in a direction that is opposite a rotational direction of the plurality of ground-engaging tools during the performance of the tillage operation, or vibrating the plurality of ground-engaging tools.

2. The method of claim 1, wherein the accumulation parameter is associated with at least one of a speed of material adjacent to the plurality of ground-engaging tools, a proximity of material to a fixed location on the tillage implement, or a rotational speed of one or more of the plurality of ground-engaging tools.

3. The method of claim 2, wherein the accumulation parameter is associated with a comparison of a ground speed of the tillage implement and the speed of the material.

4. The method of claim 1, wherein monitoring the accumulation parameter comprises receiving, with the computing device, measurement signals from at least one accumulation sensor mounted to the tillage implement.

5. The method of claim 1, wherein comparing the accumulation parameter to the material accumulation threshold comprises comparing the accumulation parameter to a first predetermined accumulation threshold and a second predetermined accumulation threshold, the second predetermined accumulation threshold differing from the first predetermined accumulation threshold and being indicative of a greater degree of material accumulation relative to the plurality of ground-engaging elements.

6. The method of claim 1, wherein the control action further comprises temporarily reducing a penetration depth of the plurality of ground-engaging elements for a predetermined period of time prior to raising the plurality of ground-engaging tools out of the ground.

7. The method of claim 1, wherein the plurality of ground-engaging tools comprise a plurality of rotary tools of the implement.

8. A system for reducing material accumulation relative to ground-engaging tools when performing a tillage operation, the system comprising:
- an implement including a frame and a plurality of ground-engaging tools supported on the frame;
- a controller including a processor and associated memory, the memory including instructions that, when implemented by the processor, configure the controller to:
  - monitor an accumulation parameter as the tillage operation is being performed, the accumulation parameter providing an indication of material accumulation relative to the plurality of ground-engaging tools;
  - compare the accumulation parameter to a material accumulation threshold, the material accumulation threshold being indicative of a given degree of material accumulation relative to the plurality ground-engaging tools; and
  - based on the comparison between the accumulation parameter and the material accumulation threshold, control an operation of at least one component of the tillage implement to execute a control action for reducing an amount of the material accumulation relative to the plurality of ground-engaging tools, the control action comprising raising the plurality of ground-engaging tools out of the ground and subsequently actuating the plurality of ground-engaging tools,
- wherein actuating the plurality of ground-engaging tools comprises at least one of rotating the plurality of ground-engaging tools in a direction that is opposite a rotational direction of the plurality of ground-engaging tools during the performance of the tillage operation, or vibrating the plurality of ground-engaging tools.

9. The system of claim 8, wherein the accumulation parameter is associated with at least one of a speed of material adjacent to the plurality of ground-engaging tools, a proximity of material to a fixed location on the tillage implement, or a rotational speed of one or more of the plurality of ground-engaging tools.

10. The system of claim 8, further comprising at least one accumulation sensor supported by the frame, the at least one accumulation parameter configured to transmit measurement signals to the controller associated with the accumulation parameter.

11. The system of claim 10, wherein the at least one accumulation sensor comprises at least one of an optical sensor, a proximity sensor, or a rotational speed sensor.

12. The method of claim 8, wherein the controller is configured to compare the accumulation parameter to a first predetermined accumulation threshold and a second predetermined accumulation threshold, the second predetermined accumulation threshold differing from the first predetermined accumulation threshold and being indicative of a greater degree of material accumulation relative to the plurality of ground-engaging elements.

13. A method for reducing material accumulation relative to ground-engaging tools of a tillage equipment, the method comprising:
- monitoring, with a computing device, an accumulation parameter as a tillage operation is being performed, the accumulation parameter providing an indication of material accumulation relative to a plurality ground-engaging tools of the tillage implement, the accumulation parameter being monitored by determining at least one of a speed of material flowing relative to the plurality of ground-engaging tools or a proximity of the material to a fixed location on the tillage implement;
- comparing, with the computing device, the accumulation parameter to a material accumulation threshold, the material accumulation threshold being indicative of a given degree of material accumulation relative to the plurality of ground-engaging tools; and,
- based on the comparison between the accumulation parameter and the material accumulation threshold, controlling, with the computing device, an operation of at least one component of the tillage implement to execute a control action for reducing an amount of the material accumulation relative to the plurality of ground-engaging tools,
- wherein the accumulation parameter is associated with a comparison of a ground speed of the tillage implement and the speed of the material flowing relative to the plurality of ground-engaging tools.

14. The method of claim 13, wherein monitoring the accumulation parameter comprises receiving, with the computing device, measurement signals from at least one accumulation sensor mounted to the tillage implement.

15. The method of claim 13, wherein comparing the accumulation parameter to the material accumulation threshold comprises comparing the accumulation parameter to a first predetermined accumulation threshold and a second predetermined accumulation threshold, the second predetermined accumulation threshold differing from the first predetermined accumulation threshold and being indicative of a greater degree of material accumulation relative to the plurality of ground-engaging elements.

16. The method of claim 15, wherein controlling the operation of the at least one component of the implement to execute the control action comprises:
- executing a first control action when the monitored accumulation parameter reaches or passes the first predetermined accumulation threshold; and
- executing a second control action when the monitored accumulation parameter reaches or passes the second predetermined accumulation threshold,
- wherein the first control action differs from the second control action.

17. The method of claim 16, wherein executing the first control action comprises temporarily reducing a penetration depth of the plurality of ground-engaging tools for a predetermined period of time, and wherein executing the second control action comprises raising the plurality of ground-engaging tools out of the ground and subsequently actuating the plurality of ground-engaging tools.

18. The method of claim 13, wherein the control action comprises temporarily reducing a penetration depth of the plurality of ground-engaging elements for a predetermined period of time.

19. The method of claim 13, wherein the control action comprises raising the plurality of ground-engaging tools out of the ground and subsequently actuating the plurality of ground engaging tools, and wherein subsequently actuating the plurality of ground-engaging tools comprises at least one of rotating the plurality of ground-engaging tools in a direction that is opposite a rotational direction of the plurality of ground-engaging tools during the performance of the tillage operation, or vibrating the plurality of ground-engaging tools.

* * * * *